United States Patent
Ichimura et al.

(10) Patent No.: US 6,928,968 B2
(45) Date of Patent: Aug. 16, 2005

(54) VARIABLE VALVE TIMING CONTROLLER FOR INTERNAL COMBUSTION ENGINE

(75) Inventors: Kazuki Ichimura, Kariya (JP); Yasuo Hirata, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/945,888

(22) Filed: Sep. 22, 2004

(65) Prior Publication Data

US 2005/0061276 A1 Mar. 24, 2005

(30) Foreign Application Priority Data

Sep. 22, 2003 (JP) ........................................ 2003-330515

(51) Int. Cl.$^7$ ................................................ F01L 1/34
(52) U.S. Cl. ................................ 123/90.15; 123/90.17; 464/160
(58) Field of Search .......................... 123/90.15, 90.16, 123/90.17, 90.18, 90.27, 90.31; 464/1, 2, 160

(56) References Cited

U.S. PATENT DOCUMENTS

| 6,397,800 B2 | * | 6/2002 | Nohara et al. | ............ 123/90.15 |
| 6,405,694 B2 | * | 6/2002 | Sato | ........................ 123/90.15 |
| 2001/0025615 A1 | | 10/2001 | Nohara et al. | |
| 2001/0050067 A1 | | 12/2001 | Sato | |

* cited by examiner

*Primary Examiner*—Thomas Denion
*Assistant Examiner*—Ching Chang
(74) *Attorney, Agent, or Firm*—Nixon & Vanderhye P.C.

(57) ABSTRACT

When a target advance angle VTT1 of an intake valve is a threshold K1 or less and when a target retard angle VTT2 of an exhaust valve is a threshold K2 or less, an intake-side variable valve timing device and an exhaust-side variable valve timing device are turned into a base mode. When a target advance angle VTT1 of an intake valve exceed the threshold K1 or when the target retard angle VTT2 of an exhaust valve exceeds the threshold K2, both of the variable valve timing devices are turned into a feedback mode at the same time.

5 Claims, 12 Drawing Sheets

VARIABLE VALVE TIMING CONTROLLER FOR INTERNAL COMBUSTION ENGINE

CROSS REFERENCE TO RELATED APPLICATION

This application is based on Japanese Patent Application No. 2003-330515 filed on Sep. 22, 2003, the disclosure of which is incorporated herein by reference.

FIELD OF THE INVENTION

The present invention relates to a variable valve timing controller for an internal combustion engine, which controls variable valve timing control devices mounted on an intake camshaft and an exhaust camshaft respectively. The variable valve timing control devices adjust opening and closing timing of intake valves and exhaust valves by oil pressure. The variable valve timing controller is referred to as the VVT controller, and the variable valve timing control device is referred to as the VVT device hereinafter.

BACKGROUND OF THE INVENTION

US-2001/0050067 A1 shows a VVT controller, which adjusts opening and closing timing of intake valves and exhaust valves in order to enhance the output of the engine, to improve the fuel efficient, and to reduce the emissions. The VVT controller has oil pressure control valves at the intake side and the exhaust side of the engine, and has an oil pump for supplying the oil pressure to the oil pressure control valves.

Figure 16:
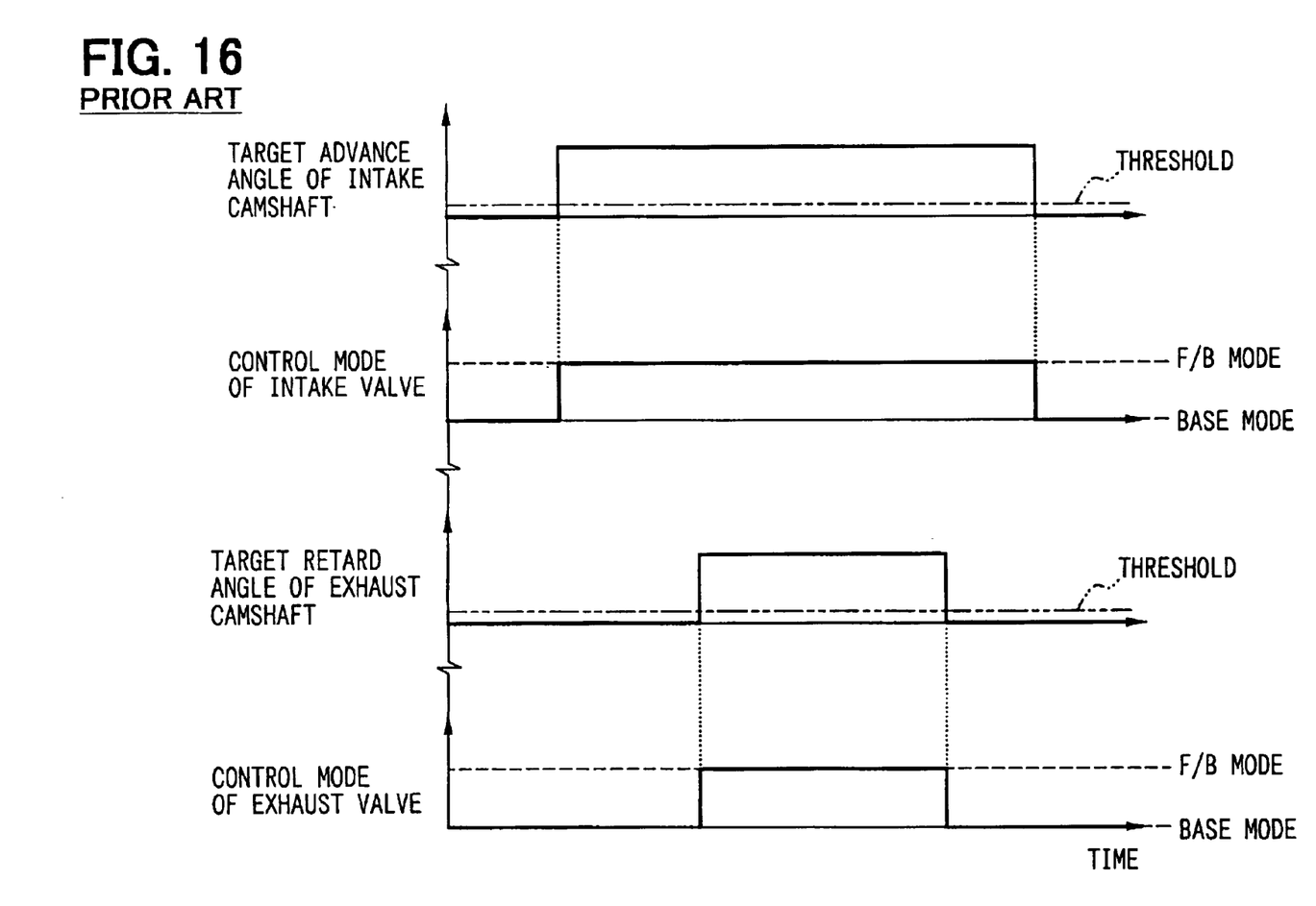
FIG. 16 is a time chart for explaining a way of changing a mode of a conventional valve timing control.
Figure 17:
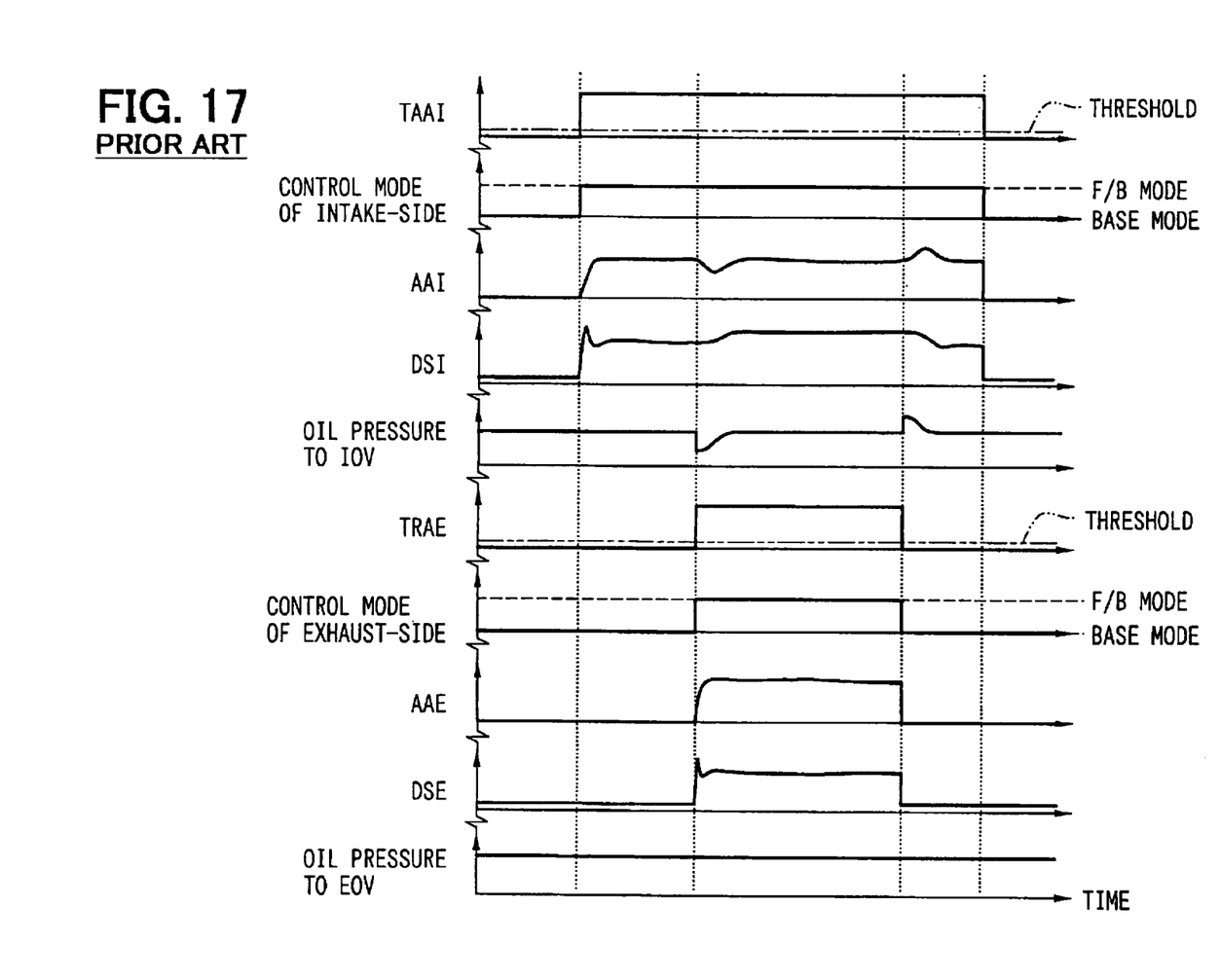
FIG. 17 is a time chart for explaining a conventional valve timing control.

As shown in FIG. 16, the control mode of each VVT device is changed independently. For example, as shown in FIG. 17, when a target advance angle of the intake camshaft TAAI is under a threshold angle which is set around the most retarded angle, an actual angle of the intake camshaft AAI is maintained at the most retarded angle, which is referred to as a base mode, by controlling a duty signal DSI supplied to the intake-side oil pressure control valve IOV.

When the target advance angle of the intake camshaft is above the threshold angle, the intake camshaft is rotated so that an angle difference between the actual angle and the target angle becomes small, which is referred to as a feedback mode.

Similarly, the exhaust camshaft is adjusted to the base mode or the feedback mode based on whether or not the target angle of the exhaust valve TRAE is under a threshold angle which is set around the most advanced angle. AAE represents a target retard angle of the exhaust camshaft, and DSE represents an duty signal supplied to the exhaust-side oil pressure control valve EOV.

In such a VVT system in which the rotational phases of the intake camshaft and the exhaust camshaft are varied independently, when one of the intake camshaft and the exhaust camshaft is in the feedback mode, the other can be changed from the base mode to the feedback mode. In this case, the actual valve timing of the camshaft in the feedback mode is varied due to the mode changing of the other camshaft.

During the base mode, the cam shafts are kept at the most advanced angle or the most retarded angle, so that little oil flows between the VVT device and the oil pressure control valve. On the other hand, during the feedback mode, the oil flows from the oil pump to the VVT device through the oil pressure control valve. When the control mode of the intake camshaft or the exhaust camshaft is changed from the base mode to the feedback mode while the other camshaft is in feedback mode, the amount of oil being supplied to the other camshaft is varied. Thus, the actual valve timing of the other camshaft is fluctuated.

To avoid the fluctuation of the actual valve timing, two individual oil pumps can be provided for each camshaft. However, such a configuration needs large space and high cost.

Alternatively, the oil pipe from the oil pump can be divided into two branch pipes, each of which is connected to the oil pressure control valve. By increasing the volume of the branch pipes between the branch point and the oil pressure control valve, the fluctuation of oil pressure can be reduced. However, in such a configuration, the length of the oil pipe becomes long, which is against the low cost and the compactness.

SUMMARY OF THE INVENTION

An object of the present invention is to provide a variable valve timing controller, which can avoid the fluctuation of an actual valve angle of one variable valve timing device in order to enhance an accuracy of variable valve timing while the other variable valve timing device is in a feedback mode.

According to the present invention, a variable valve timing controller includes an intake-side variable valve timing device, an exhaust-side variable valve timing device, oil pressure control valves disposed for the respective variable valve timing device, an oil pump, and a mode changing means for changing a control mode of the variable valve timing devices. The mode changing means changes the control mode of the intake-side and the exhaust-side variable valve timing devices into the same mode at the same time.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

(First Embodiment)

Figure 1:
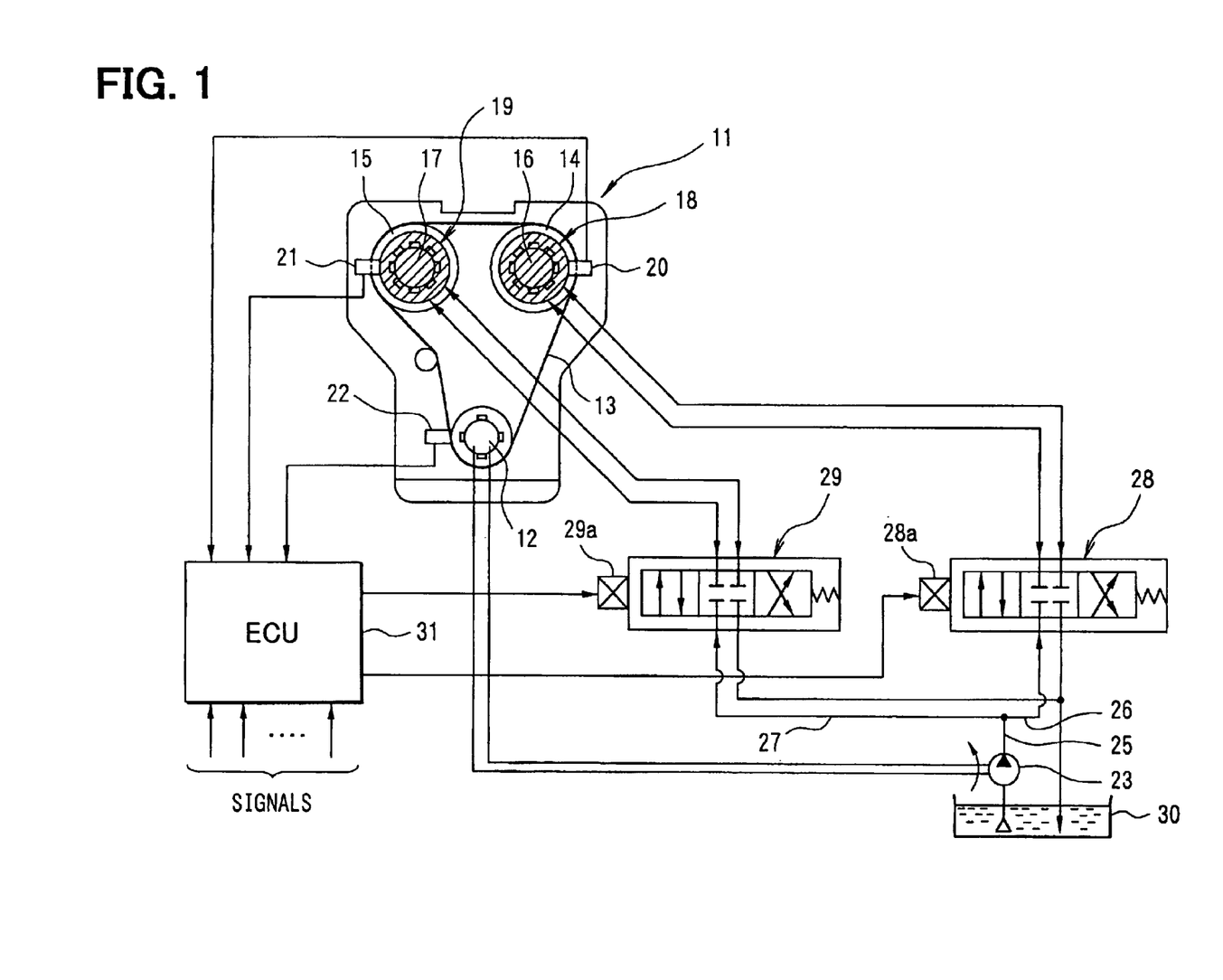
FIG. 1 is a schematic view of a variable valve cam timing control system according to the first embodiment of the present invention.

FIG. 1 is a schematic view of the VVT control system. A driving force of an engine 11 is transferred from a crankshaft 12 to an intake camshaft 16 and an exhaust camshaft 17 through a timing chain 13 (or timing belt) and sprockets 14, 15.

An intake-side VVT device 18 which is operative by oil pressure is connected to the intake camshaft 16. A rotational phase of the intake camshaft 16 relative to the crankshaft 12 is advanced from the most retarded angle (the base angle) by the intake-side VVT device 18. An exhaust-side VVT device 19 which is operative by oil pressure is connected to the exhaust camshaft 17. A rotational phase of the exhaust camshaft 17 relative to the crankshaft 12 is retarded from the most advanced angle (the base angle) by the exhaust-side VVT device 17. exhaust An intake-side cam angle sensor 20 is provided around the intake camshaft 16, which outputs an intake-side cam angle signal every certain angle. An exhaust-side cam angle sensor 22 is provided around the exhaust camshaft 17, which outputs an exhaust-side cam angle signal every certain angle. A crank angle sensor 22 is provided around the crankshaft 12, which outputs a crank angle signal every certain angle.

An oil pump 23 is driven by the crankshaft 12, and an oil pipe 25 is connected to the outlet of the oil pump 23. The oil pipe 25 is branched into two branch pipes 26, 27. A first oil pressure control valve 28 is connected to the first branch pipe 26 and a second oil pressure control valve 29 is connected to the second branch pipe 27. The oil pump 23 pumps up oil in an oil pan 30 and supplies the oil to the first and the second oil pressure control valves 28, 29.

Figure 2:
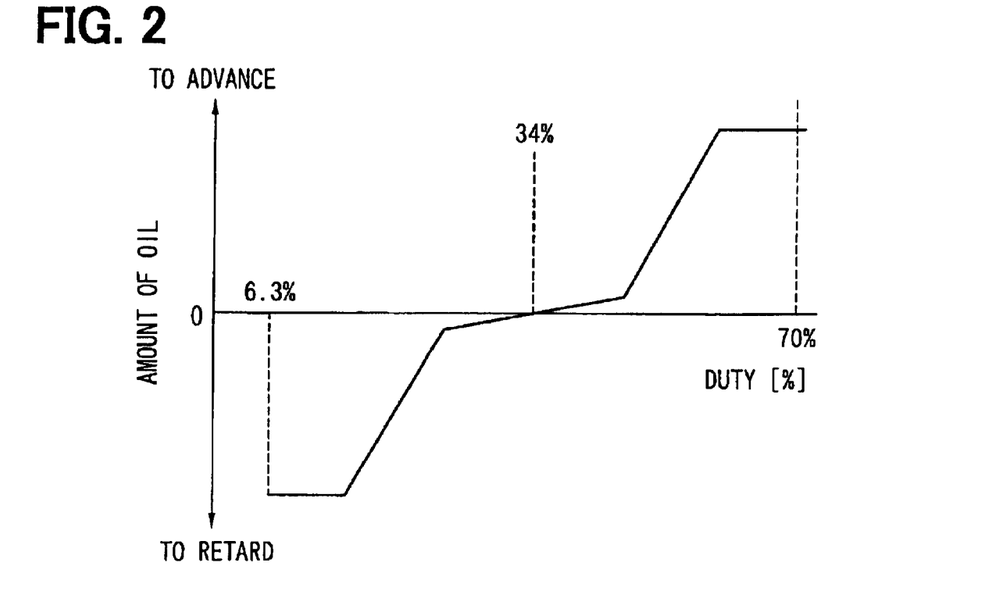
FIG. 2 is a diagram showing a characteristic of an oil pressure control valve which controls an amount of oil to be supplied to a variable valve timing device.

Both of the valves 28, 29 are electric valves having solenoids 28a, 29a respectively, and are operated by receiving a duty signal. As shown in FIG. 2, the amount of oil which is to be supplied to an advance chamber (not shown) or a retard chamber (not shown) of the VVT devices 18, 19 is varied according to the duty ratio of the duty signal.

The output signals from the sensors 20, 21, 22 are input to an electrical control unit 31, which is referred to as ECU 31 hereinafter. The ECU 31 includes a microcomputer, which controls an amount of fuel injection and ignite timing of spark plug (not shown) by performing engine control programs stored in a ROM.

Figure 6:
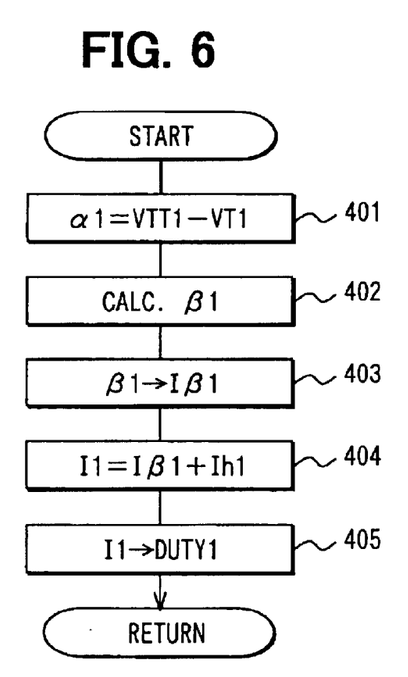
FIG. 6 is a flowchart showing a routine for feedback controlling the intake valve.
Figure 7:
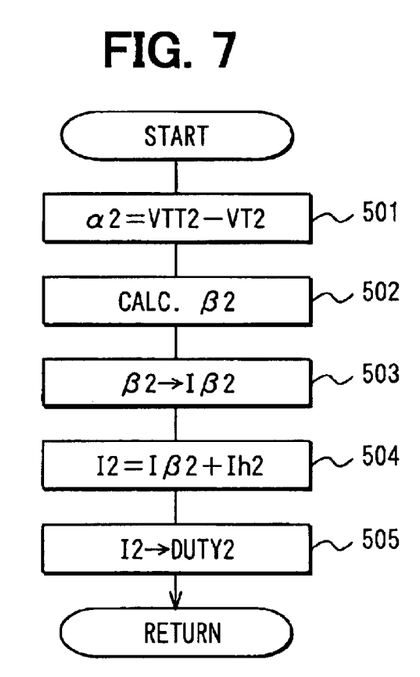
FIG. 7 is a flowchart showing a routine for feedback controlling the exhaust valve.
Figure 8:
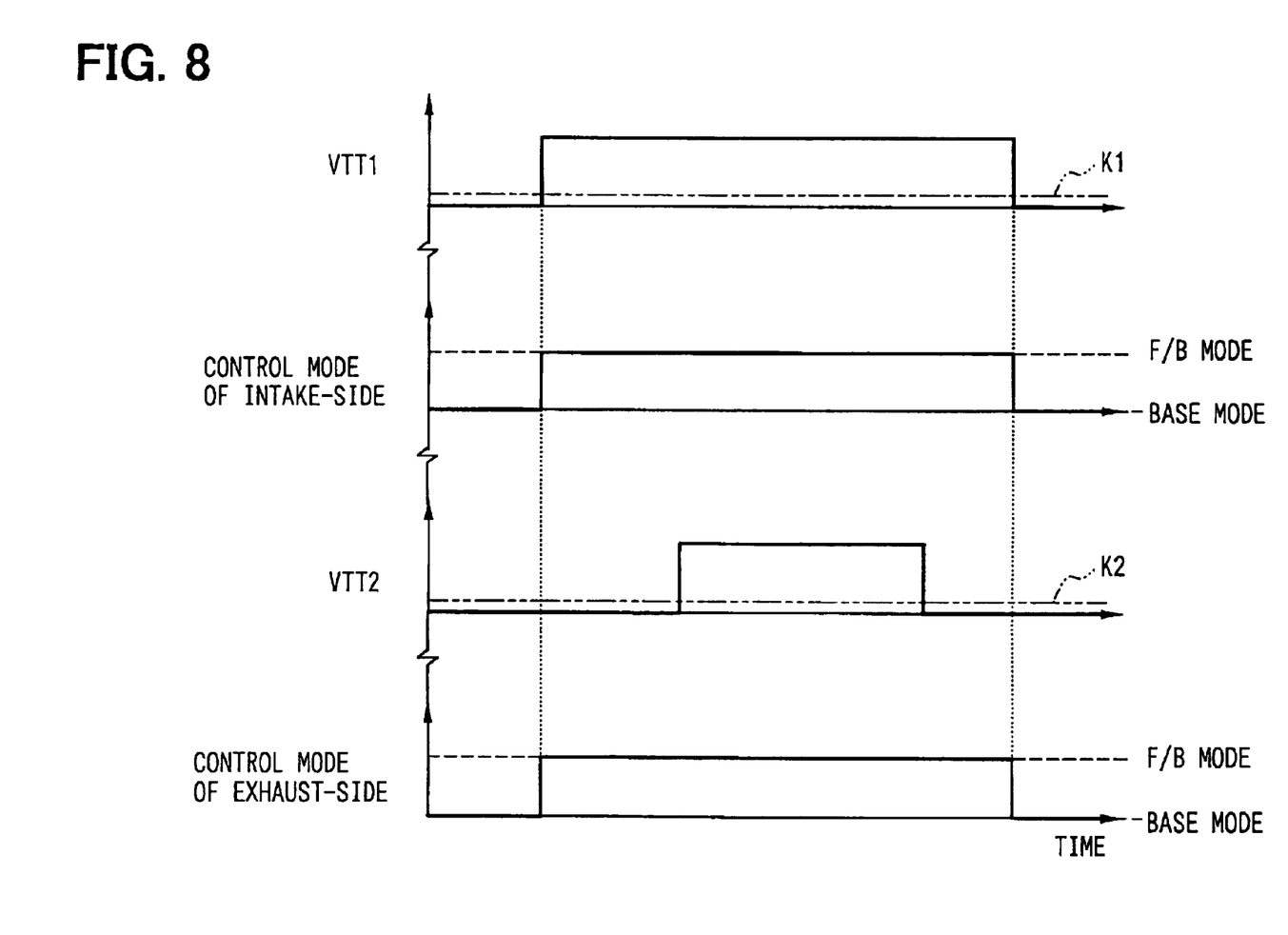
FIG. 8 is a time chart for explaining a way of changing mode of the variable valve timing device according to the first embodiment.

The ECU 31 executes the program shown in FIGS. 3 to 7. As shown in FIG. 8, when the target advance angle VTT1 of the intake valve timing is a threshold angel K1 or less, and when the target retard angle VTT2 of the exhaust valve timing is a threshold angle K2 or less, both of the intake-side VVT device 18 and the exhaust-side VVT device 19 are turned into the base mode. When the target advance angle VTT1 is larger than the threshold angle K1, or when the target retard angle VTT2 is larger than the threshold angle K2, both of the intake-side VVT device 18 and the exhaust-side VVT device 19 are turned into the feedback mode. That is, the VVT device 18 and the VVT device 19 are turned into the same mode simultaneously. The threshold angle K1 is set around the most retarded angle of the intake valve, and the threshold angle K2 is set around the most advanced angle of the exhaust valve.

Figure 9:
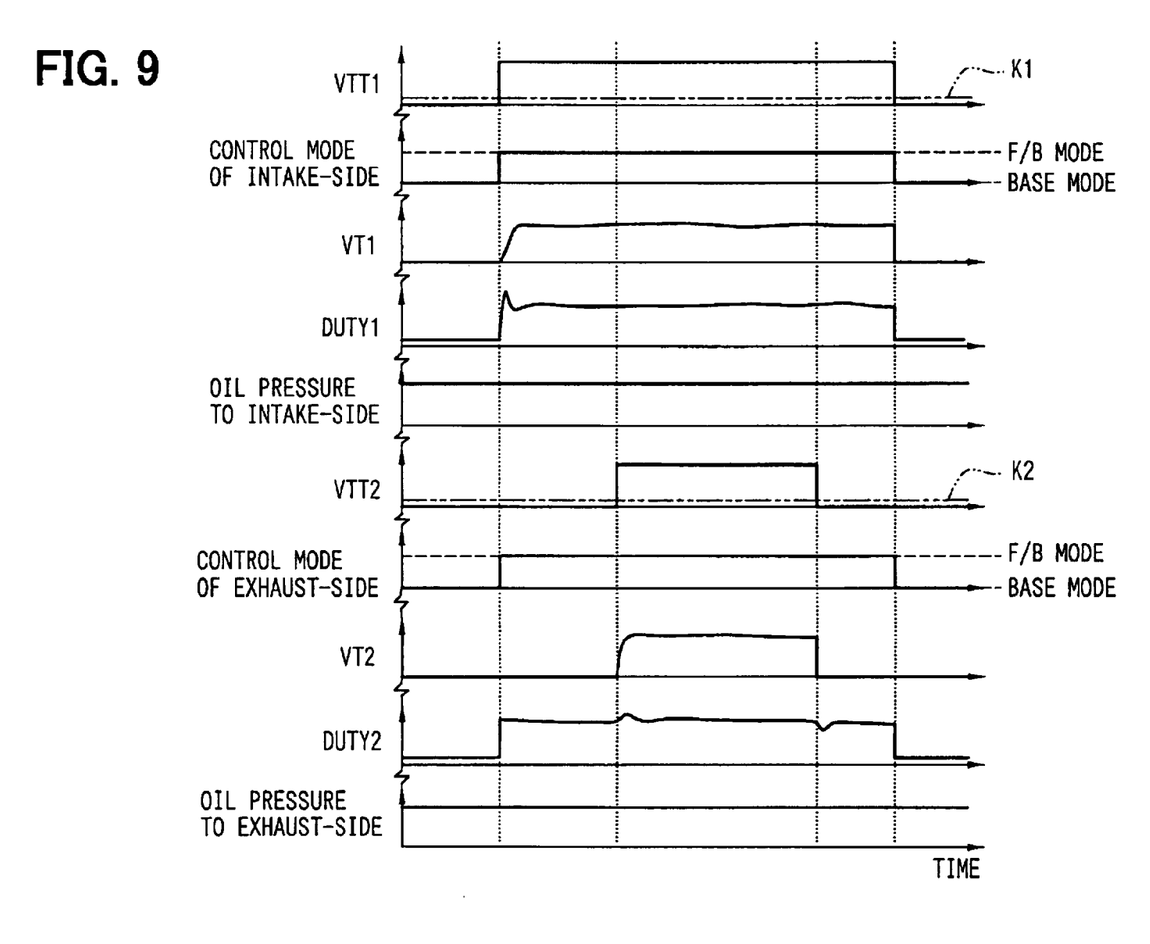
FIG. 9 is a first time chart showing a valve timing control according to the first embodiment.

As shown in FIG. 9, when the intake-side VVT device 18 and the exhaust-side VVT device 19 are in the base mode, the duty ratio Duty1 of current supplied to the first oil pressure control valve 28 is determined in such a manner that the actual valve timing of the intake valve becomes most retarded, which is the base angle. The duty ratio Duty2 of current supplied to the second oil pressure control valve 29 is determined in such a manner that the actual valve timing of the exhaust valve becomes most advanced, which is base angle.

When the intake-side VVT device 18 and the exhaust-side VVT device 19 are in the feedback mode, the duty ratio Duty1 is determined in such a manner that the difference between the target advance angle VTT1 and the actual advance angle VT1 of the intake valve becomes smaller. The duty ratio Duty2 is determined in such a manner that the difference between the target retard angle VTT2 and the actual retard angle VT2 of the exhaust valve becomes smaller.

Referring to FIGS. 3 to 7, the processes which are executed by the ECU 31 are described herein after.

Figure 3:
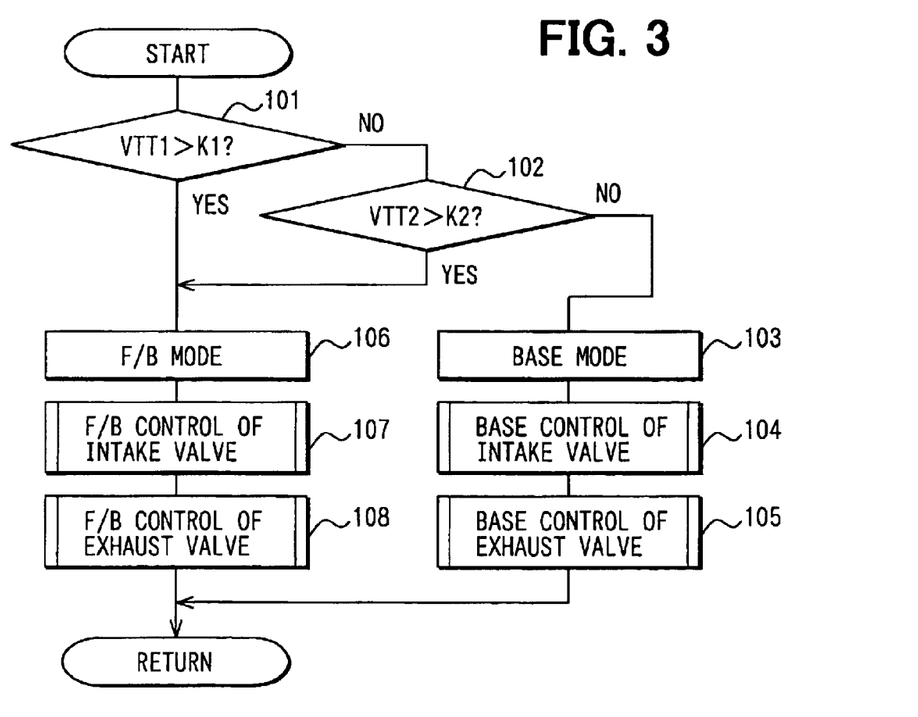
FIG. 3 is a flowchart showing a routine for switching a mode of the variable valve timing device according to the first embodiment.

A mode switching routine shown in FIG. 3 is executed periodically after an ignition switch is turned on. The mode switching routine functions as a control mode switching means. In step 101, it is determined whether the target advance angle VTT1 of the intake valve is larger than the threshold angle K1. That is, it is determined whether the intake valve is in the feedback mode. The threshold angle K1 is set to an advanced angle which is a little advanced from the most retarded angle.

When it is determined the target advance angle VTT1 of the intake valve is the threshold angle K1 or less, the procedure proceeds to step 102. Instep 102, it is determined whether the target retard angle VTT2 of the exhaust valve is larger than the threshold angle K2. That is, it is determined whether the exhaust valve is in the feedback mode. The threshold angle K2 is set to a retarded angle which is a little retarded from the most advanced angle.

When it is determined NO in step 101 and when it is determined NO in step 102, the procedure proceeds to step 103 in which the intake-side VVT device 18 and the exhaust-side VVT device 19 are kept in the base mode or turned into the base mode.

Figure 4:
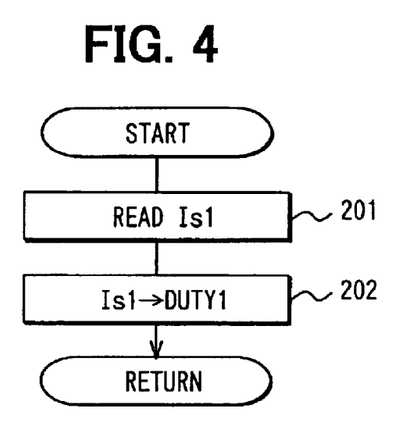
FIG. 4 is a flowchart showing a routine for controlling an intake valve to most retarded angle.
Figure 5:
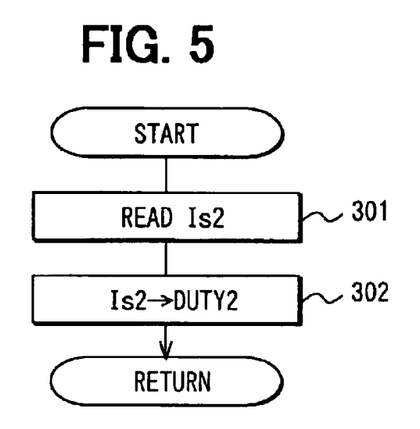
FIG. 5 is a flowchart showing a routine for controlling an exhaust valve to the most advanced angle.

In step 104, a routine shown in FIG. 4 is executed so that the actual valve timing of the intake valve is most retarded. In step 105, a routine shown in FIG. 5 is executed so that the actual valve timing of the exhaust valve is most advanced.

When it is determined that the target advance angle VTT1 is larger than the threshold angle K1 instep 101, or when it is determined that the target retard angle VTT2 is larger than the threshold angle K2, the procedure proceeds to step 106 in which the intake-side VVT device 18 and the exhaust-side VVT device 19 are kept or turned into the feedback mode simultaneously.

In step 107, a feedback routine shown in FIG. 6 is executed so that the deference between the target advance angle VTT1 and the actual advance angle VT1 becomes small by controlling the first oil pressure control valve 28. Instep 108, a feedback routine shown in FIG. 7 is executed so that the deference between the target retard angle VTT2 and the actual retard angle VT2 becomes small by controlling the second oil pressure control valve 29.

In step 104, when the most retard angle routine shown in FIG. 4 is executed, a most retard angle current Is1 is read from the ECU 31 in step 201, the most retard angle current Is1 being the current for maintaining the actual valve angle of the intake valve at the most retarded angle. This current Is1 is predetermined according to the characteristic of the first oil pressure control valve 28, which is determined based on experimental data or design data thereof.

In step 202, the most retard angle current Is1 is converted to the duty ratio Duty1. The first oil pressure control valve 28 is controlled under the duty ratio Duty1, so that the actual valve angle of the intake valve is kept the most retarded angle.

In step 105, when the most retard angle routine shown in FIG. 5 is executed, a most advance angle current Is2 is read from ECU 31 instep 301, the most advance angle current Is2 being the current for maintaining the actual valve angle of the exhaust valve at the most advanced angle. This current Is2 is predetermined according to the characteristic of the second oil pressure control valve 29, which is determined based on experimental data or design data thereof.

In step 302, the most advance angle current Is2 is converted to the duty ratio Duty2. The second oil pressure control valve 29 is controlled under the duty ratio Duty2, so that the actual valve angle of the exhaust valve is kept the most advanced angle.

In step 107, when the feedback routine for intake valve shown in FIG. 6 is executed, the deference $\alpha 1$ between the target advance angle VTT1 and the actual advance angle VT1 is derived based on the following equation.

$$\alpha 1 = VTT1 - VT1$$

The procedure proceeds to the step 402 in which a feedback value $\beta 1$ is calculated with a following PID equation in order to decrease the value of the deference $\alpha 1$.

$$\beta 1 = Kp \cdot \alpha 1 + Ki \cdot \int \alpha 1 \, dt + Kd \cdot d\alpha 1/dt$$

Kp is a proportionality constant, Ki is an integral constant, and Kd is a differential constant.

The feedback value $\beta 1$ is converted into a feedback current value $I\beta 1$ in step 403, and a driving current I1 is derived by adding the feedback current value $I\beta 1$ to a holding current Ih1 in step 404. The holding current Ih1 is the current for maintaining the rotational phase of the intake valve at the time.

$$I1 = I\beta 1 + Ih1$$

The driving current I1 is converted into the duty ratio Duty1 in step 405. The first oil pressure control valve 28 is controlled under the duty ratio Duty1, so that the actual valve angle VT1 of the intake valve is made to be consistent with the target advance angle VTT1.

In step 108, when the feedback routine for exhaust valve shown in FIG. 7 is executed, the deference $\alpha 2$ between the target retard angle VTT2 and the actual advance angle VT2 is derived based on the following equation.

$$\alpha 2 = VTT2 - VT2$$

The procedure proceeds to the step 502 in which a feedback value $\beta 2$ is calculated with a following PID equation in order to decrease the value of the deference $\alpha 2$.

$$\beta 2 = Kp \cdot \alpha 2 + Ki \cdot \int \alpha 2 \cdot dt + Kd \cdot d\alpha 2/dt$$

The feedback value $\beta 2$ is converted into a feedback current value $I\beta 2$ in step 503, and a driving current I2 is derived by adding the feedback current value $I\beta 2$ to a holding current Ih2 in step 504. The holding current Ih2 is the current for maintaining the rotational phase of the exhaust valve at the time.

The driving current I2 is converted into the duty ratio Duty2 in step 505. The second oil pressure control valve 29 is controlled under the duty ratio Duty2, so that the actual valve angle VT2 of the exhaust valve is made to be consistent with the target retard angle VTT2.

Figure 10:
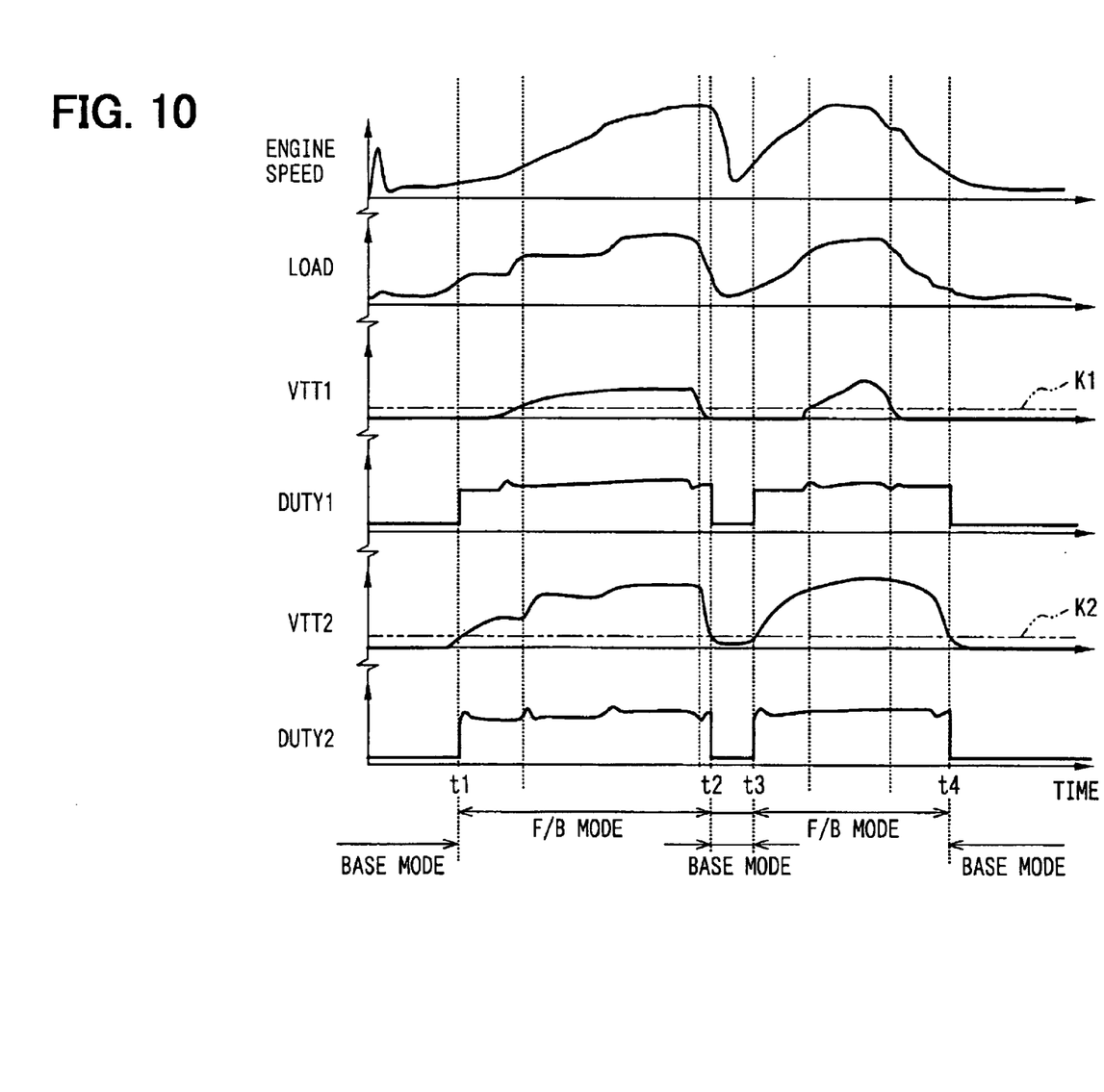
FIG. 10 is a second time chart showing a valve timing control according to the first embodiment.

Referring to FIG. 10, the operation of the first embodiment is described hereinafter. While the engine speed Ne and the engine load are low, for example while the engine is at idle, the target advance angle VTT1 of the intake valve and the target retard angle VTT2 of the exhaust valve are under the threshold angles K1, K2. The intake-side VVT device 18 and the exhaust-side VVT device 19 are kept in the base mode.

After that, when the engine speed Ne and the engine load become high and when at least one of the target advance angle VTT1 and the target retard angle VTT2 becomes larger than the threshold K1, K2 at the time of t1 (or t3), the intake-side VVT device 18 and the exhaust-side VVT device 19 are turned into the feedback mode at the same time.

While the VVT devices 18, 19 are in the feedback mode, when the target advance angle VTT1 and the target retard angle VTT2 are threshold K1, K2 or less, the intake-side VVT device 18 and the exhaust-side VVT device 19 are turned into the base mode at the same time.

In the first embodiment described above, the intake-side VVT device 18 and the exhaust-side VVT device 19 are turned into the same mode at the same time. Therefore, the oil supplied to one of the VVT device 18 and the VVT device 19 hardly affects the operation of the other VVT device, so that the actual valve angle hardly fluctuates to enhance the accuracy of the VVT control. And, when the target advance angle VTT1 or the target retard angle VTT2 is turned to be more than the threshold angle K1, K2, the VVT devices 18, 19 can be operated in the feedback mode rapidly.

In the first embodiment, the threshold angles K1, K2 are fixed values. However, the threshold angles K1, K2 can be variable to have hysteresis, so that hunting of the VVT devices 18, 19 is restricted.

Figure 11:
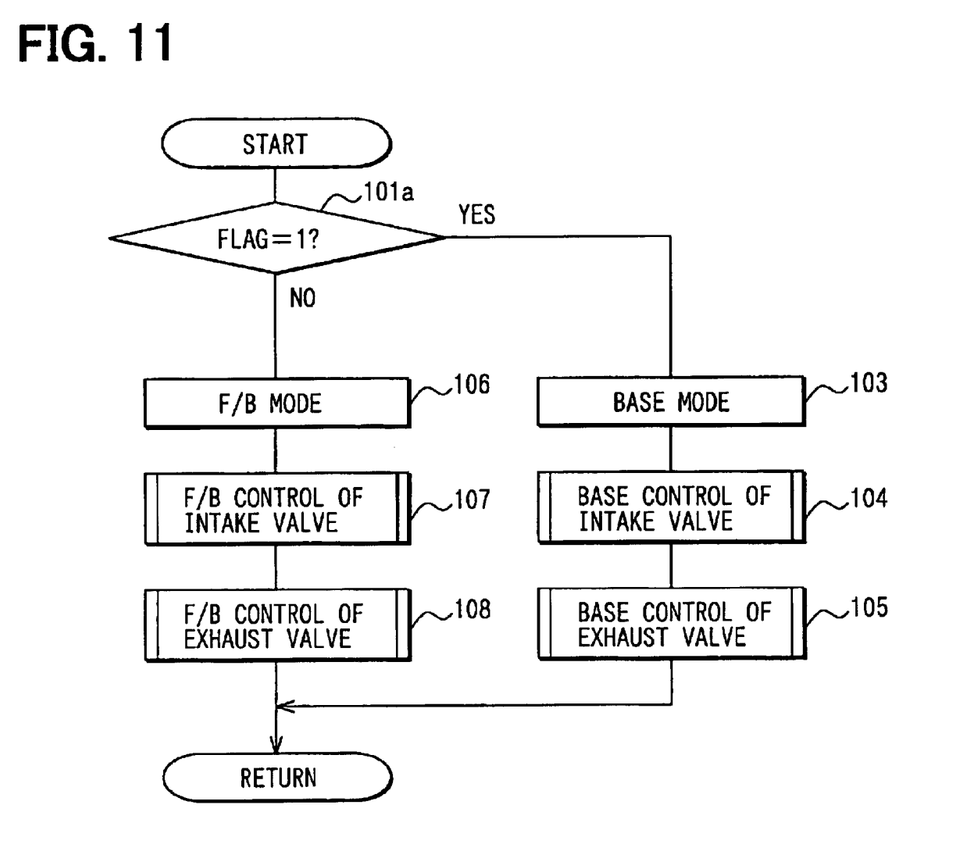
FIG. 11 is a flowchart showing a routine for switching a mode of the variable valve timing device according to the second embodiment.
Figure 12:
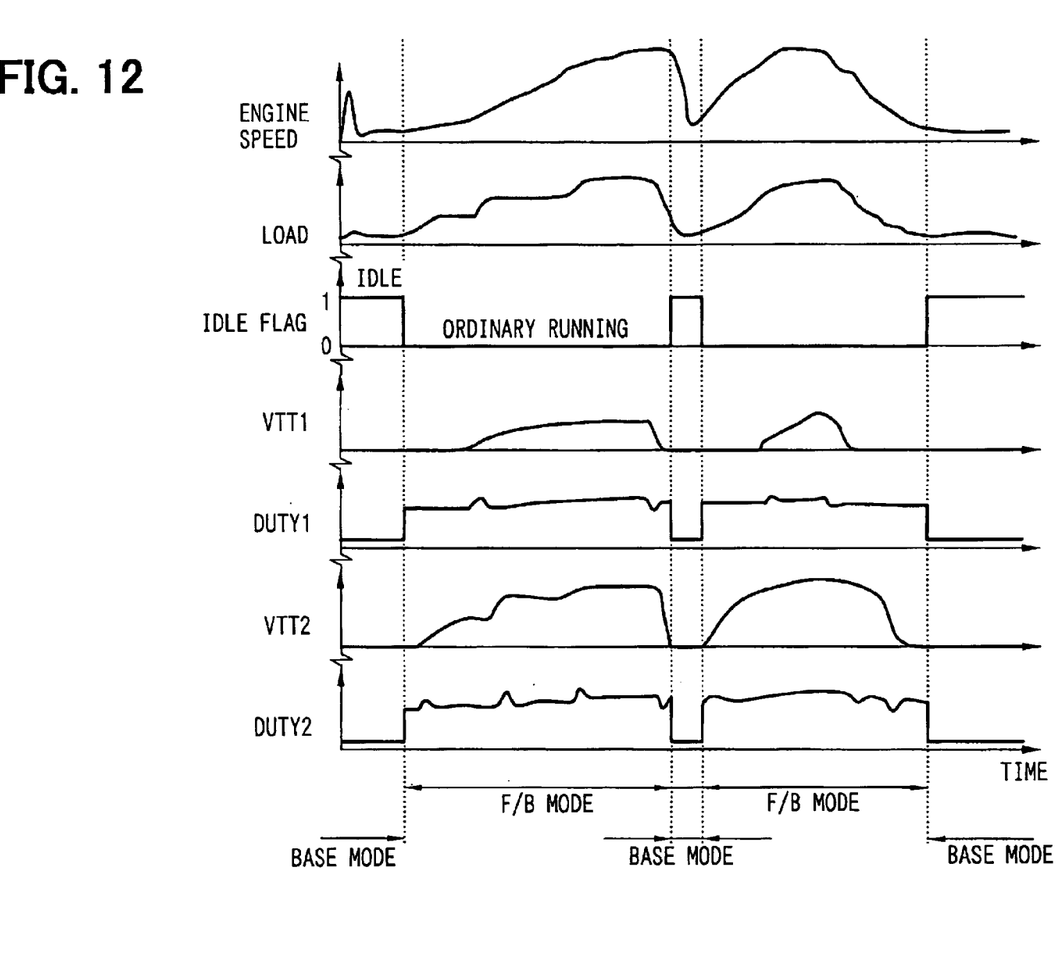
FIG. 12 is a time chart for explaining a valve timing control according to the second embodiment.

Referring to FIGS. 11 and 12, the second embodiment is described hereinafter.

Generally, when the engine is at idle, the valve angle of the intake valve is most retarded and the valve angle of the exhaust valve is most advanced. While the engine is ordinarily running except idling, when the engine speed or the engine load is increased and the target advance angle or the target retard angle exceeds the threshold angle, the feedback control of the VVT device is started. That is the feedback control is necessary when the engine is ordinarily running.

In the second embodiment, a control routine shown in FIG. 11 is executed. As shown in FIG. 12, when the engine is at idle, both of the VVT devises 18, 19 are turned into the base mode. When the engine is ordinarily running, both of the VVT devices 18, 19 are turned into the feedback mode.

The control routine shown in FIG. 11 is the same routine as shown in FIG. 3 except step 101a. In step 101a, it is determined whether a flag is turned to "1", which represents that the engine is at idle. When the flag is "1", the actual valve angle of the intake valve is set to the most retarded angle and the actual valve angle of the exhaust valve is set to the most advanced angle in steps 103 to 105.

When it is determined that the engine is not at idle in step 101a, both of the VVT devices 18, 19 are kept or turned into the feedback mode, so that the deference angle between the target advance angle VTT1 and the actual advance angle VT1 is decreased by controlling the first oil pressure control valve 28, and the deference angle between the target retard angle VTT2 and the actual retard angle VT2 is decreased by controlling the second oil pressure control valve 29 in steps 106 to 108.

In the second embodiment, the modes of the intake-side VVT device 18 and the exhaust-side VVT device 19 are changed at the same time based on the condition of the flag. Thus, the modes of those are precisely changed into the feedback mode at the same time.

Figure 13:
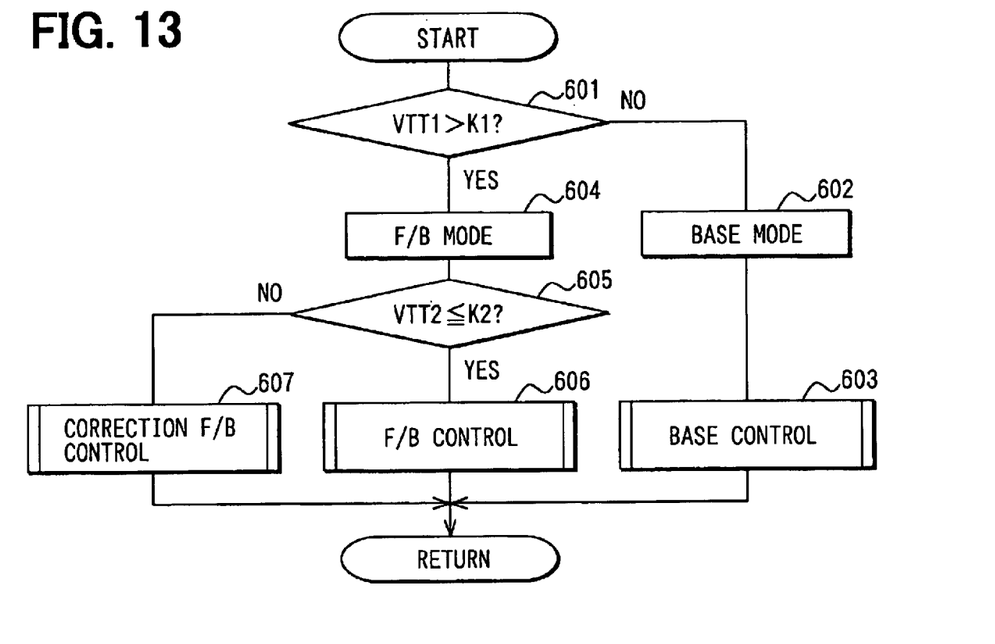
FIG. 13 is a flowchart showing a routine for changing a mode of the intake-side variable valve timing device according to a third embodiment.
Figure 14:
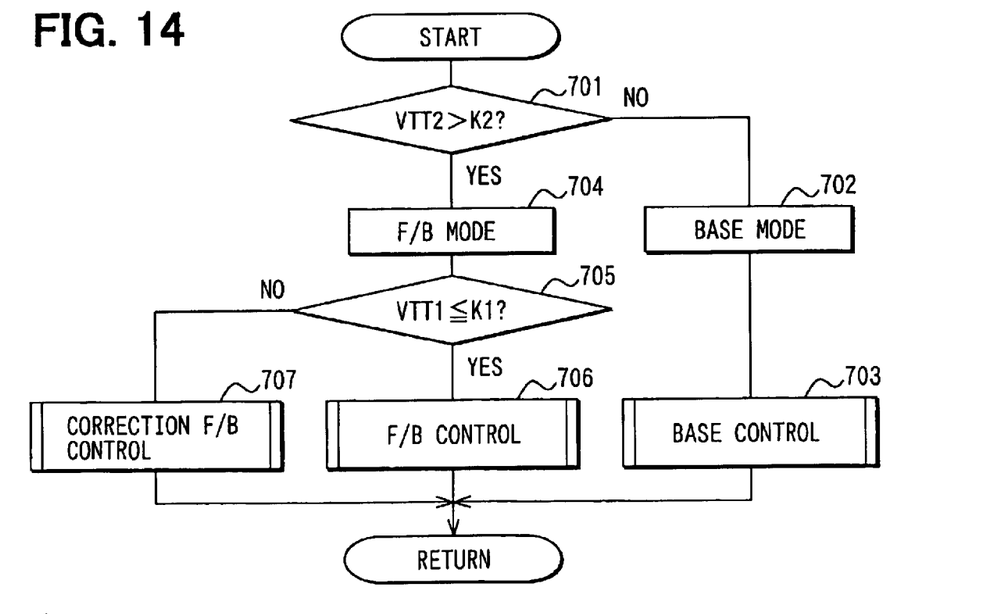
FIG. 14 is a flowchart showing a routine for changing a mode of the exhaust-side variable valve timing device according to the third embodiment.
Figure 15:
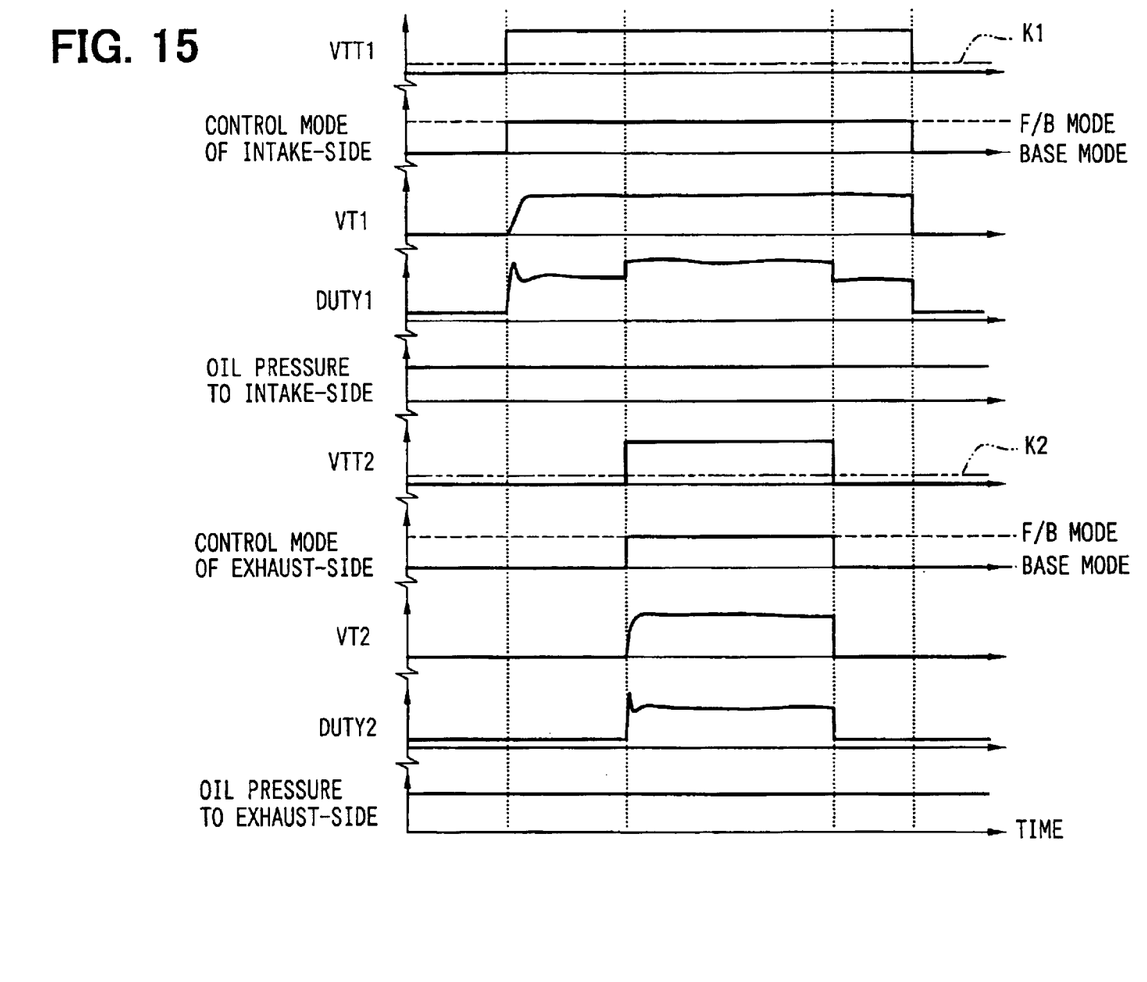
FIG. 15 is a time chart for explaining a valve timing control according to the third embodiment.

Referring to FIGS. 13 to 15, the third embodiment is described hereinafter.

Routines shown in FIGS. 13 and 14 are performed to control the modes of intake-side VVT device 18 and the exhaust-side VVT device 19, which is shown in FIG. 15. When the target advance angle VTT1 of the intake valve is the threshold angle K1 or less, the intake-side VVT 18 is turned into the base mode. When the target advance angle VVT1 exceeds the threshold K1, the intake-side VVT 18 is turned into the feedback mode. When the target retard angle VTT2 is the threshold K2 or less, the exhaust-side VVT device 19 is turned into the base mode. When the target angle VTT2 is exceeds the threshold K2, the exhaust-side VVT device 19 is turned into the feedback mode.

When one of the intake-side VVT device 18 and the exhaust-side VVT device 19 is turned into the feedback mode and the other is in the feedback mode, the duty ratio Duty supplied to the oil pressure control valve connected to the other VVT device is corrected.

In the control routine of the intake-side VVT device 18, which is shown in FIG. 13, it is determined whether the target advance angle VTT1 of the intake valve exceeds the threshold K1 or not. When it is determined that the target advance angle VTT1 is the threshold K1 or less, the procedure proceeds to step 602 in order to keep or change the mode of the intake-side VVT device 18 into the base mode. During the base mode, the routine shown in FIG. 4 is executed in step 603 to keep the actual valve angle at the most delayed angle.

In step 601, when it is determined the target advance angle VTT1 exceeds the threshold angle K1, the procedure proceeds to step 604 in which the intake-side VVT device 18 is kept or turned into the feedback mode.

During the feedback mode, the procedure proceeds to step 605 in which it is determined whether the target retard angle VTT2 is threshold K2 or less. When it is determined YES in step 605, the procedure proceeds to step 606 in which the routine shown in FIG. 6 is executed so that the first oil pressure control valve 28 is controlled to decrease the deference between the target advance angle VTT1 and the actual advance angle VT1.

When the target retard angle VTT2 is exceeds the threshold angle K2, the procedure proceeds to step 607 in which the correction feedback routine is executed by which the duty ratio Dury1 is corrected by correction value G1 as follows:

$$Duty1 = Duty1 \times G1$$

wherein G1 is established in such a manner that the intake valve timing in feedback mode is not fluctuated by the mode switching of the exhaust-side VVT device 19.

The first oil pressure control valve 28 is controlled under the corrected duty ratio Duty1 so that the deference angle between the target advance angle VTT1 and the actual advance angle VT1 becomes smaller.

In the routine shown in FIG. 14, it is determined whether the target retard angle VTT2 of the exhaust valve exceeds the threshold angle K2 in step 701. When it is determined that the target retard angle VTT2 is the target retard angle VTT2 or less, the procedure proceeds to step 702 in which the exhaust-side VVT device 19 is kept or turned to the base mode.

During the base mode, the routine shown in FIG. 5 is executed to keep the actual valve angle of the exhaust valve at the most advanced angle in step 703.

When it is determined the target retard angle VTT2 of the exhaust valve exceeds the threshold K2, the procedure proceeds to step 704 in which the exhaust-side VVT device 19 is kept or turned into the feedback mode.

In step 705, it is determined whether the target advance angle VTT1 is the threshold K1 or less. When it is determined YES in step 705, the procedure proceeds to step 706 in which the routine shown in FIG. 7 is executed so that the second oil pressure control valve 29 is controlled to decrease the deference between the target retard angle VTT2 and the actual retard angle VT2.

When it is determined NO in step 705, the procedure proceeds to step 707 in which the correction feedback routine is executed by which the duty ratio Dury2 is corrected by correction value G2 as follows:

$$Duty2 = Duty2 \times G2$$

wherein G2 is established in such a manner that the exhaust valve timing in feedback mode is not fluctuated by the mode switching of the intake-side VVT device 18.

The second oil pressure control valve 29 is controlled under the corrected duty ratio Duty2 so that the deference angle between the target advance angle VTT2 and the actual advance angle VT2 becomes smaller.

The third embodiment also has the same effect as the first embodiment.

In the third embodiment, the duty ratio Duty is corrected. Instead of correcting the duty ratio Duty, the feedback value β or driving current I can be corrected. At least one of the gains Kp, Ki, Kd of the PID control can be corrected.

When one of the intake-side VVT device and the exhaust-side VVT device is changed into the feedback mode, both feedback values can be corrected.

In the aforementioned embodiment, the base angles are set to the most advanced angle and the most retarded angle. The base angles can be set to the intermediate angles between the most retarded and the most advanced.

What is claimed is:

1. A variable valve timing controller for an internal combustion engine, said controller comprising:
   an intake-side variable valve timing device which changes valve timing of an intake valve and is operated by oil pressure;
   an exhaust-side variable valve timing device which changes valve timing of an exhaust valve and is operated by oil pressure;
   oil pressure control valves disposed for adjusting oil pressure supplied to each of the variable valve timing devices;
   an oil pump generating oil pressure commonly used for each of the oil pressure control valves; and
   mode changing means for changing a control mode of the variable valve timing devices,
   wherein the mode changing means changes the intake-side variable valve timing device and the exhaust-side variable valve timing device between a base mode and a feedback mode by controlling the oil pressure, the oil pressure control valves control the intake-side and the exhaust-side variable valve timing devices in such a manner that actual valve angles thereof are the base angles in a base mode, the oil pressure control valves control the intake-side and the exhaust-side variable valve timing devices in such a manner that actual valve angles closes to a target valve angle in a feedback mode, and the mode changing means changes the control mode of the intake-side and the exhaust-side variable valve timing devices into the same mode at the same time.

2. A variable valve timing controller for an internal combustion engine as in claim 1, wherein when at least one of the intake-side variable valve timing device and the exhaust-side variable valve timing device enters into the feedback mode, both of the variable valve timing devices are changed into the feedback mode at the same time, and when both of the intake-side variable valve timing device and the exhaust-side variable valve timing device enter into the base mode, both of the variable valve timing devices are changed into the base mode.

3. A variable valve timing controller for an internal combustion engine as in claim 1, wherein the mode changing means has hysteresis.

4. A variable valve timing controller for an internal combustion engine, said controller comprising:

an intake-side variable valve timing device which changes valve timing of an intake valve and is operated by oil pressure;

an exhaust-side variable valve timing device which changes valve timing of an exhaust valve and is operated by oil pressure;

oil pressure control valves disposed for adjusting an oil pressure supplied to each of the variable valve timing devices;

an oil pump generating oil pressure commonly used for each of the oil pressure control valves; and mode changing means for changing a control mode of the variable valve timing devices, wherein the mode changing means changes the intake-side variable valve timing device and the exhaust-side variable valve timing device between a base mode and a feedback mode by controlling the oil pressure, the oil pressure control valves control the intake-side and the exhaust-side variable valve timing devices in such a manner that actual valve angles thereof are the base angles in a base mode, the oil pressure control valves control the intake-side and the exhaust-side variable valve timing devices in such a manner that actual valve angles close to a target valve angle in a feedback mode, when the engine is normally running, the intake-side and the exhaust-side variable valve timing devices are kept in the feedback mode, and when the engine is at idle, the intake-side and the exhaust-side variable valve timing devices are changed into the base mode at the same time.

5. A variable valve timing controller for an internal combustion engine said controller comprising:

an intake-side variable valve timing device which changes valve timing of an intake valve and is operated by oil pressure;

an exhaust-side variable valve timing device which changes valve timing of an exhaust valve and is operated by oil pressure;

oil pressure control valves disposed for adjusting oil pressure supplied to each of the variable valve timing devices;

an oil pump generating oil pressure commonly used for each of the oil pressure control valves; and mode changing means for changing control mode of the variable valve timing devices, wherein the mode changing means changes the intake-side variable valve timing device and the exhaust-side variable valve timing device between a base mode and a feedback mode by controlling the oil pressure, the oil pressure control valves control the intake-side and the exhaust-side variable valve timing devices in such a manner that an actual valve angles thereof are the base angles in a base mode, the oil pressure control valves control the intake-side and the exhaust-side variable valve timing devices in such a manner that the actual valve angles close to a target valve angle in a feedback mode, when one of the intake-side variable valve timing device and the exhaust-side variable valve timing device is in the feedback mode, or when both of the intake-side variable valve timing device and the exhaust-side variable valve devices are in the feedback mode, a feedback value is corrected, and when one of the intake-side variable valve timing device and the exhaust-side variable valve timing device is changed into the feedback mode and the other is in the feedback mode, the feedback value of the other device is corrected at the same time.

* * * * *